United States Patent
Lukasiewicz et al.

[11] Patent Number: 5,740,594
[45] Date of Patent: Apr. 21, 1998

[54] METHOD FOR MAKING A FLUID PRESSURE TRANSDUCER

[75] Inventors: Stanley J. Lukasiewicz; Vishwa N. Shukla, both of North Attleboro, Mass.; Allan J. Siuzdak, Cumberland, R.I.

[73] Assignee: Texas Instruments Incorporated, Dallas, Tex.

[21] Appl. No.: 681,252

[22] Filed: Jul. 22, 1996

[51] Int. Cl.$^6$ .................................. H01G 5/16
[52] U.S. Cl. .................. 29/25.41; 264/61; 264/66; 361/283.4; 361/284
[58] Field of Search .............. 29/25.41; 264/59, 264/60, 61, 66; 361/283.4, 284

[56] References Cited

U.S. PATENT DOCUMENTS

| | | |
|---|---|---|
| 4,716,492 | 12/1987 | Charboneau et al. |
| 5,525,280 | 6/1996 | Shukla et al. .............. 264/61 X |
| 5,544,399 | 8/1996 | Bishop et al. .............. 29/25.41 |

OTHER PUBLICATIONS

Silver–Palladium Thick–Film Conductors Sea Fue Wang, Joseph P. Dougherty, Wayne Huebner, John G. Pepin Journal of the American Ceramic Society; vol. 77, No. 12 –pp. 3051–3072, Dec. 1994.

Primary Examiner—Carl E. Hall
Attorney, Agent, or Firm—Russell E. Baumann; Richard L. Donaldson; René E. Grossman

[57] ABSTRACT

A capacitive fluid pressure transducer is shown formed of a monolithic ceramic body (10) having a cavity located between a diaphragm portion (12) and a base portion (14). Opposed capacitor plates (22, 24) are disposed on opposed surfaces of the diaphragm portion and the base portion. The capacitor plates (22, 24) are formed of palladium oxide/silver having a ratio selected to create a fluid pressure level in the cavity as a result of oxygen evolution incident to the reduction of palladium oxide during the sintering cycle to offset the tendency of the diaphragm to bow inwardly due to shrinkage mismatch of the metal and ceramic materials.

13 Claims, 1 Drawing Sheet

METHOD FOR MAKING A FLUID PRESSURE TRANSDUCER

BACKGROUND OF THE INVENTION

This invention relates generally to fluid pressure sensors and more particularly to fluid pressure responsive, variable parallel plate capacitive transducers. Such transducers are shown and described, for example, in U.S. Pat. No. 4,716,492, assigned to the assignee of the present invention. A capacitive transducer is shown in that patent having a thin ceramic diaphragm mounted in closely spaced, sealed, overlying relation on a ceramic base, with metal coatings deposited on respective opposing surfaces of the diaphragm and the base to serve as capacitor plates arranged in predetermined closely spaced relation to each other to form a capacitor. Transducer terminals connected to the capacitor plates are arranged at an opposite surface of the transducer base and a signal conditioning electrical circuit connected to the transducer terminals is mounted on the transducer. A cup-shaped connector body of electrical insulating material is fitted over the electrical circuit and is secured to the transducer by a housing sleeve which has a port for exposing the transducer diaphragm to an applied fluid pressure. The diaphragm is movable in response to variations in pressure applied to the diaphragm to vary the capacitance of the capacitor and the electrical circuit provides an electrical output signal corresponding to the applied pressure.

In copending, coassigned patent application Ser. No. 07/972,680 filed Nov. 6, 1992, the subject matter of which is incorporated herein by this reference, a capacitive pressure transducer is shown and described in which metal capacitor plates are disposed on opposite sides of two surfaces defining a cavity or gap formed closely adjacent to an outer surface of a monolithic ceramic body. In one embodiment, the ceramic comprises conventional material, such as alumina, provided in powdered form coated with an organic binder pressed into first and second portions, i.e., a diaphragm and a base having a recess formed in an outer surface, by pressing the powder in a die. Metallization coatings are deposited, as by screen printing a thick film paste on one surface of the diaphragm portion and on the recessed outer face surface of the base portion. A spacer of organic material is optionally placed in the recess to ensure that the cavity gap is maintained during a following pressing step. The two portions are pressed together to form a single unit and the unit is then heated to a first debinderizing temperature. After the organics, including the spacer means, are vaporized/decomposed and released through still open pores of the ceramic, the unit is placed in a high temperature oven and co-fired in a reducing atmosphere with the metal layers forming a conductive coating bonded to the ceramic and the ceramic being sintered to form a monolithic, closed pore body.

In a second embodiment, low temperature ceramic materials are employed for the ceramic allowing sintering at a temperature sufficiently low to permit the use of conventional printed circuit inks fired in an air atmosphere. The low temperature co-fired ceramic (LTCC) offers substantial cost benefits in being able to avoid having to use an expensive high temperature oven as well as a special reducing atmosphere.

Conventional printed circuit inks, such as silver containing inks, however, have shrinkage characteristics which do not match the shrinkage characteristics of the ceramic material. Such inks may be modified by infilling with ceramic particles or the like to adjust the shrinkage characteristics sufficiently for use with relatively massive substrates, however, they are not suitable for use with thin membranes or slow firing rates, e.g., less than 10° C./minute in which little or no warping of the membrane can be tolerated. That is, capacitor transducers which are the subject of the invention have a gap between a relatively massive base portion and a thin diaphragm of as small as approximately 1 mil in devices which operate as intended. While the industry standard for matching shrinkage characteristics is 1 mil per inch, this is totally unacceptable for such transducers. Only a slight amount of mismatch of ink on the thin diaphragm will cause the diaphragm to warp thereby closing the gap and short circuiting the capacitor plate layers or opening the gap causing the capacitance between the plates to become excessively low outside a calibration window of acceptable capacitance values.

It is an object of the present invention to provide fluid pressure responsive capacitive transducers composed of a ceramic body having electrically conductive layers on opposed surfaces of a gap, particularly in a body in which the gap is defined by at least one relatively thin portion of the body, having a consistent, selected distance between such layers from device to device and methods for producing such transducers. Another object of the invention is the provision of an electrically conductive ink system for use in ceramics having improved shrinkage matching characteristics with such ceramics particularly useful in systems having sintering heating cycles utilizing low rates of temperature rise or thin substrates. Yet another object is the provision of an ink system used with ceramic materials particularly useful when used in gaps defined in monolithic ceramic devices.

Briefly, in accordance with the invention, palladium oxide is added to silver powder of the ink system to change the sintering temperature of the metallic components. The ratio of palladium oxide to silver is selected to provide ink having shrinkage characteristics generally matching that of ceramic material with which the ink is to be used. The palladium oxide, silver mixture is heated to approximately 450° C. for approximately 15 minutes to convert any remnant palladium to palladium oxide. After mixing with an appropriate vehicle to form an ink, a selected pattern of the ink is applied to opposite sides of a recess defined by base and diaphragm portions and the portions are joined together, as by pressing, and heated through presintering and sintering cycles. The rate of rise, particularly in the sintering cycle, is less than approximately 10° C./minute and preferably at approximately 2°–4° C./minute to form a monolithic device. According to a feature of the invention, a first ratio of palladium oxide to silver, by weight, is selected so that ink disposed on a corresponding diaphragm portion and processed separately, i.e., without any base, will cause little or no warping of the diaphragm portion upon being subjected to the above stated presintering and sintering cycles. For an LTCC ceramic mixture having a sintering temperature in the range of 700°–850° C., a suitable first ratio is in the range of approximately 55% to 65% palladium oxide. When applied to a diaphragm and fired in a condition in which the diaphragm is not restrained, i.e., it is not attached to another member, the above first ratio of 55–65% palladium oxide to 45–35% silver provides a close match of temperature at which the diaphragm and the ink shrink upon sintering with a result that there is little or no bowing of the diaphragm. However, when ink having this ratio is used on a diaphragm surface in an hermetic cavity and fired the diaphragm domes outwardly causing the gap to increase well beyond the desired range. This doming is believed to be caused by the evolution of oxygen as the palladium oxide reduces after the pores in the ceramic material have closed. In accordance with the invention the temperature at which the oxygen is evolved is lowered so that a substantial amount of the oxygen is allowed to escape through the pores of the ceramic before the pores close. This is achieved by decreasing the percentage of the palladium oxide in the palladium oxide/silver mixture. However, lowering the palladium oxide content increases a shrinkage mismatch between the ink and the ceramic material. According to the invention there is a narrow range of palladium oxide percentages which result in most of the oxygen being evolved prior to the closing of the pores in the ceramic body but still with sufficient oxygen evolved after closing of the pores to create sufficient internal pressure in the cavity to balance the shrinkage mismatch and prevent inward bowing of the diaphragm into the gap when the ceramic portion is soft. The specific range is related to the sintering temperature and pore closure temperature of the ceramic material and varies with the particular ceramic material employed. For certain ceramic materials having a sintering temperature of between approximately 700°–850°, it has been found that a second ratio of approximately 40–46% palladium oxide, 60–54% silver is very effective in producing a pressure cushion to offset the shrinkage tendency of the ink on the diaphragm and prevent inward movement of the diaphragm into the gap.

BRIEF DESCRIPTION OF THE DRAWINGS

Other objects, advantages and details of the novel and improved transducer and method of the invention appear in the following detailed description of preferred embodiments of the invention, the detailed description referring to the drawings in which.

DETAILED DESCRIPTION OF PREFERRED EMBODIMENT

Figure 1:
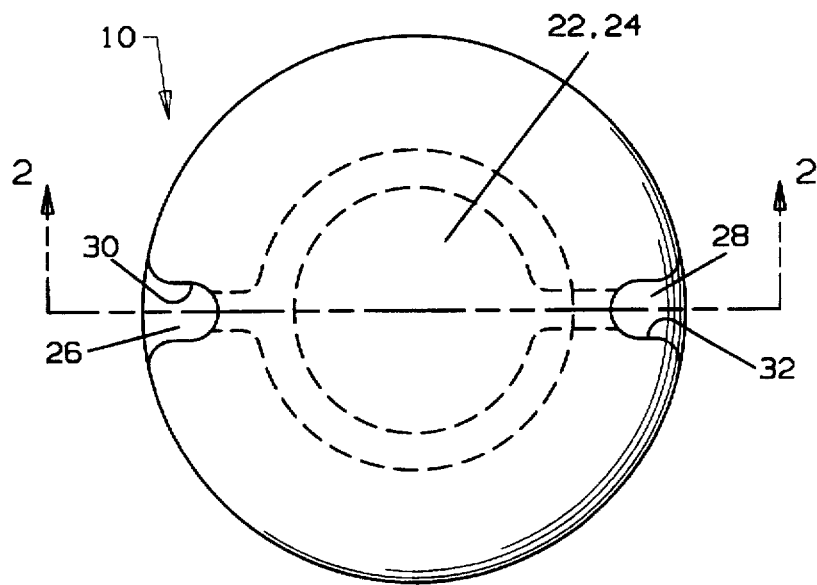
FIG. 1 is a top plan view of a monolithic capacitive pressure transducer made in accordance with the invention.

A variable capacitive fluid pressure responsive transducer made in accordance with the invention, comprises a monolithic body of ceramic material having a cavity formed therein closely adjacent to an outer surface of the body. Capacitor plates formed of suitable material, such as metal, are disposed on opposite surfaces of the cavity with vias extending from the plates to respective terminal pads for connection to externally disposed signal conditioning electrical circuitry (not shown).

Various low temperature co-fired ceramic (LTCC) materials may be utilized. A suitable material comprises either a granulated or ungranulated powder composed of approximately 40% by weight of an inert ceramic such as alumina and 60% by weight of a glass having a softening temperature between approximately 650°–700° C. This results in an LTCC material having a sintering temperature of approximately 700°–850° C. Such material is conventional in the electronic substrate industry. The powder contains an organic binder such as plasticized polyvinyl alcohol or an acrylic emulsion to serve as a temporary adhesive holding the powder together after pressing until the resultant pressed powder is sintered.

Using a pressure in the range of approximately 1,000–30,000 psi, the LTCC powder is pressed into the shape of a generally cylindrical diaphragm 12 and a generally cylindrical base 14 having a recess 16 formed in a surface of the base. The depth of the recess is selected to allow for shrinkage of the materials upon sintering to provide spacing between capacitor plates applied to the bottom of the recess and the inner surface of the diaphragm of approximately 1 mil in the finished transducer.

After the initial pressing, the green ceramic components are strong enough to permit handling. Selected electrode patterns, 18, 20 are applied to the bottom surface of the diaphragm and the upper surface of the base respectively by any suitable means, such as screen printing. Patterns 18, 20 include opposed capacitor plate portions 22, 24 respectively connected to respective terminal portions, 26, 28 to provide external connection to suitable electronic circuitry at cut-out portions 30, 32 respectively of diaphragm 12. For screen printing, the metallization is applied in the form of conventional paste which typically contains certain solvents to adjust viscosity for screen printing. After application, the solvents can be removed slowly at room temperature or more rapidly by placing the parts in an oven at a suitable temperature such as approximately 100° C.

Although it is possible to press the diaphragm and base together without any spacing means placed therebetween in the recess and still maintain a gap between the diaphragm and the bottom of the recessed area, it is preferred to use fugitive spacer material. Spacer material helps to maintain the separation between the pair of electrodes and prevent them from engaging one another when the diaphragm is pressed to the base. A circular fugitive spacer element composed of essentially non-compressible, consumable or decomposable material having a thickness essentially equal to the desired spacing between the electrodes, or a plurality of sheets of such material the total thickness of which essentially equals the desired spacing, is placed in the recess. The spacer material is selected so that it is clean burning, i.e., so that there is no ash remaining after the spacer material has been thermally removed. Polypropylene carbonate is an example of such material.

Although it is preferred to form the gap by pressing recess into the base and/or diaphragm, it should be noted that the gap could also be formed by placing a fugitive spacer element between the base and diaphragm in which no recess is preformed and to press the parts together. The diaphragm and base will then conform to a shape of the spacer element to form the gap when the spacer element is thermally removed.

The diaphragm, base and spacer material are pressed together in a die or suitable isostatic press at a pressure between approximately 1,000 and 30,000 psi. The diaphragm and base, now pressed together to form a single body or unit is placed in an oven and heated in an air atmosphere at relatively low temperatures, e.g., 450° C. in order to evaporate and burn out the binders and spacer material and allow the evaporated matter and combustion gases to pass through the pores of the body before the body is sintered and the pores closed.

After removal of the organic binder and the spacer material during the presintering debinderization step the temperature is increased to the sintering temperature of approximately 700°–850° C.

In many applications precise matching of the shrinkage characteristics of the ceramic and the electrode ink is not critical, however, when used in the transducer structure of the present invention comprising a diaphragm, e.g., ≦100 mils, and a gap between electrodes of approximately 1 mil, shrinkage characteristics are of great importance. It has been found that conventional silver inks have sufficiently different shrinkage rates relative to that of the ceramic material and that when applied to the diaphragm and sintered the diaphragm bows thereby closing the gap and shorting the electrodes or opening the gap resulting in too low a capacitance value.

In accordance with the invention, a selected amount of palladium oxide is added to the silver ink to adjust the temperature at which the metal shrinks to more closely match that of the ceramic. Although it is conventional to use palladium/silver mixtures for other purposes, such as minimizing silver leaching when soldering, the palladium content has generally been limited to lower percentages due, not only to cost, but also to problems associated with oxide layers which occur with high palladium percentages thereby creating additional soldering problems. Typically, in LTCC systems, the substrate and ink are rapidly heated, e.g., at a rate greater than 10° C./minute in order to minimize shrinkage differences. However, due to the geometry of the pressure transducer of the present invention, a heating rate of less than approximately 10° C./minute is preferred to prevent differential shrinkage problems associated with a device having a relatively massive base and a relatively thin diaphragm defining an enclosed gap. The palladium is oxidized prior to the application of ink to the ceramic so that expansion of the metal layer due to oxidation of palladium as the temperature of the parts is being raised during the binder burn-out step does not cause a problem of cracking, separating of the diaphragm from the base or the like. It is known that the temperature at which palladium oxidizes is dependent upon the ratio of palladium to silver in a palladium silver mixture and in the range of palladium used in the present invention a temperature of approximately 450° C. is found to completely oxidize the palladium. Once oxidized, the palladium oxide is stable until its temperature is increased to approximately 500° C. at which it will begin to reduce to palladium.

As noted above, for ceramic material which sinters between approximately 700° C. and 850° C., a first ratio, by weight, of from approximately 55–65% palladium oxide to 45–35% silver applied to a diaphragm and sintered by itself provides a close match of shrinkage characteristics with little or no warpage of the diaphragm. It should be noted that the palladium oxide referred to in the ratios set forth in this specification is based on commercially available material which may include remnant palladium.

The above first ratio is very effective when applied to a ceramic substrate having no gaps and is useful in various applications. However, when the mixture is applied to a diaphragm which is then joined to a base to define a gap and sintered, the dimension of the gap increases by several hundred percent from one mil to several mils, consequently resulting in a capacitance level well below an acceptable level. This phenomenon apparently is caused by the evolution of oxygen as the palladium oxide is reduced after the pores in the ceramic have closed as the temperature is raised to the sintering temperature. When making transducers, in accordance with the invention, the palladium content in the ink is decreased to a second ratio thereby lowering the temperature at which palladium oxide begins to reduce and at which oxygen is evolved so that a substantial amount of oxygen can escape through pores in the ceramic material prior to their closure. This second ratio of palladium oxide to silver is selected so that there will still be sufficient oxygen evolved after the pores close to provide fluid pressure in the gap to offset the bowing tendency of the diagram due to the shrinkage mismatch of palladium/silver relative to the ceramic caused by decreasing the palladium oxide content from the first ratio of 55–65% described above. The fluid pressure in the gap forms a gas cushion offsetting any tendency of the diaphragm, still soft and easily deformable, as the temperature is increased above the melting point of the glass during the sintering cycle, from moving into the gap caused by shrinkage mismatch, differential shrinkage or slumping due to gravity and yet the pressure level is not so high that it will cause significant doming of the diaphragm away from the base. Once the material has sintered and the unit is cooled down to ambient temperatures, the palladium again oxidizes creating a reduced pressure in the cavity which has a serendipitous effect of making the transducer less sensitive to calibration shifts caused by changes in ambient temperature. When using the above referenced LTCC material, a palladium oxide content in palladium oxide to silver ink of approximately 40–46% is found to be effective. A palladium oxide content lower than approximately 40% results in closing the gap more than desirable while palladium oxide contents above approximately 46% increase the gap more than desirable. The specific range will vary based on changes in the specific materials used and the softening temperature of the glass in the particular ceramic material employed as well as the volume of the gap, the thickness of the diaphragm and the surface area of the electrode layer.

Transducers were made in accordance with the invention using the above referenced LTCC material. A second ratio of 44% palladium oxide powder and 56% silver powder was selected for the ink. The mixture was heated to a temperature of approximately 450° C. for approximately 15 minutes to oxidize any remnant palladium. An organic vehicle was added and the ink was screen printed on the base and diaphragm. After application of the electrode pattern the parts were pressed together with a spacer element of polypropylene carbonate in the cavity and then slowly heated in a presintering cycle to remove the organic binder and spacer materials. The cycle for binder burn-out took approximately 20 hours with the temperature brought up to approximately 450° C. After completion of the presintering cycle the base and diaphragm were then sintered by increasing the temperature at approximately 2.6° C./minute to approximately 820° C. and maintained at that temperature for approximately fifteen minutes. After cooling to ambient, completed transducer units were tested and found to have a desired gap of approximately 1 mil.

Figure 2:
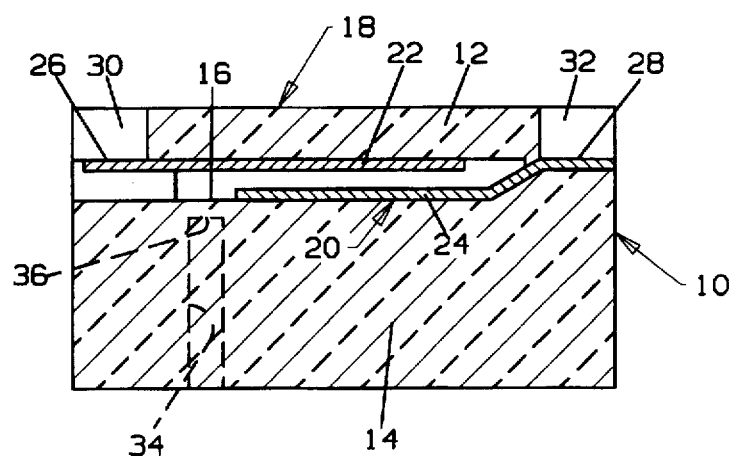
FIG. 2 is a cross sectional view taken on lines 2—2 of FIG. 1.

Transducers made as described above are hermetic, however, vented transducers can also be made, for example, by providing a means for forming an opening into the cavity after sintering. For example, as shown in FIG. 2, a bore 34 (dashed lines) can be formed in the substrate using suitable means such as an appropriate forming tool, a fugitive spacer or the like, aligned with the cavity but leaving a small diameter wall 36. Wall 36 can be ruptured after firing the transducer using a laser or other suitable piercing means.

It should be understood that though preferred embodiments of the invention have been described by way of illustrating the invention, this invention includes all modifications and equivalents of the disclosed embodiments falling within the scope of the appended claims. For example, although the diaphragm and the base are described in the specification as being formed by pressing techniques, it should be understood that diaphragms and bases made employing other techniques, such as tape casting or roll compacting, come within the purview of the invention. Further, with regard to the conductive ink, it will be understood that although the ink is described in the specification as being prepared by adding palladium oxide particles to silver particles and then raising the temperature of the mixture to convert any remnant palladium to palladium oxide it will be appreciated that if the source of palladium oxide is sufficiently pure it may be possible that the heating step to convert remnant palladium to palladium oxide could be omitted. It will also be realized that, if desired, palladium metal particles could be used as a starting material and mixed with silver particles and heated to convert the palladium to palladium oxide. Still another variation intended to come within the purview of the invention is the use of a palladium silver alloy or the like as the source of the palladium oxide and silver used for ink.

What is claimed:

1. A process for making a fluid pressure responsive capacitive transducer unit comprising the steps of
    taking a mixture of ceramic particles, glass particles and an organic binder capable of being sintered in an air atmosphere,
    pressing the mixture into a first relatively thick base and a second relatively thin diaphragm with a recess formed in an outer surface of at least one of the base and diaphragm which interfaces with the other of the base and diaphragm,
    taking an electrically conductive metallic ink comprising palladium oxide particles and silver particles in an organic vehicle and applying a layer having a selected pattern of the ink on a surface of the base and the diaphragm including the recess to form opposing capacitor plates,
    pressing the base and the diaphragm together to form a transducer unit with the ink forming the opposing capacitor plates being in overlying, spaced relation with each other, and
    raising the temperature of the transducer unit to a presintering temperature for sufficient time to turn any organic material in the transducer unit into a gas and allow the gas to escape from the transducer unit and then to a sintering temperature to allow the ceramic particles and the metallic particles of the ink to sinter forming a closed pore, monolithic structure and then allowing the transducer to cool to ambient temperature, the ratio of the palladium oxide particles to silver particles in the ink being selected by identifying a first ratio which will cause a separate, second diaphragm comprising the said mixture with a coating of the said metallic ink to sinter with essentially no warpage of the second diaphragm and then selecting and using a second ratio for the metallic ink which is applied to the base and the diaphragm by slightly decreasing the amount of palladium oxide to decrease the temperature at which palladium oxide reduces so that oxygen will be evolved while pores of the ceramic material are open as well as after the pores have closed to create a gas cushion in the recess when raising the temperature of the transducer unit through the reduction temperature range of the palladium oxide up to the sintering temperature, the gas cushion being sufficient to prevent movement of the diaphragm into the gap but insufficient to cause the diaphragm to significantly bow away from the base.

2. A process according to claim 1 in which the rate of temperature rise to the presintering temperature and to the sintering temperature is less than approximately 10° C./minute.

3. A process according to claim 2 in which the rate of temperature rise from the presintering temperature and to the sintering temperature is approximately 2°–4° C./minute.

4. A process according to claim 1 in which the palladium oxide particles and silver particles, prior to being put into the organic vehicle, are mixed together and heated to approximately 450° C. for at least approximately 15 minutes to ensure that any unoxidized palladium is oxidized.

5. A process according to claim 1 in which the first ratio, by weight, is approximately 55–65% palladium oxide to 45–35% silver and the second ratio, by weight, is approximately 40–46% palladium oxide to 60–54% silver.

6. A process according to claim 1 further including the step of inserting a fugitive spacer element in the recess prior to pressing the base and diaphragm together.

7. A process for making a device composed of ceramic material having a conductor on a surface defining a gap in the device and sintering the device using low temperature co-firing techniques comprising the steps of pressing a mixture of ceramic particles, glass particles and an organic binder into a base and a diaphragm with a recess formed between a portion of the baseband diaphragm, taking an electrically conductive metallic ink comprising palladium oxide and silver in an organic vehicle having a selected ratio of palladium oxide to silver and applying a layer of the ink on a surface of the base and the diaphragm defining the gap and raising the temperature of the device and ink layer up through a presintering temperature to burn the organics out of open pores of the ceramic material and then to a sintering temperature to close the open pores, the selected ratio being chosen so that palladium oxide starts to reduce prior to the closing of the pores of the ceramic material and continues to reduce after the pores have closed so that there is sufficient gaseous pressure in the gap to prevent the ceramic material from moving into the gap but insufficient to cause any significant warping of the portion of the device defining the gap.

8. A process according to claim 7 in which the temperature is raised from the presintering temperature to the sintering temperature at approximately 2°–4° C./minute.

9. A process according to claim 7 in which the palladium oxide particles and silver particles, prior to being put into the organic vehicle, are mixed together and heated to approximately 450° C. for at least approximately 15 minutes to ensure that any unoxidized palladium is oxidized.

10. A process for making a device composed of ceramic material having a conductor on a surface defining a gap in the device and sintering the device using low temperature co-firing techniques in which the ceramic is formed from a mixture of ceramic particles, glass particles and an organic binder and being formed into a base and a diaphragm and the conductor is formed from electrically conductive metallic ink applied to surfaces of the base and diaphragm defining the gap, the ink comprising palladium oxide and silver in an organic vehicle and the base and diaphragm with the ink applied thereto are joined together to form a unit, the temperature of the unit being raised through a presintering temperature to burn the organics out of open pores of the ceramic material and then to a sintering temperature to close the open pores, comprising the steps of selecting the ratio of palladium oxide to silver so that the palladium oxide starts to reduce prior to the closing of the pores of the ceramic material and continues to reduce after the pores have closed so that there is sufficient gaseous pressure in the gap to prevent the ceramic material from moving into the gap but insufficient to cause any significant warping of the portion of the device defining the gap.

11. A process according to claim 10 in which the temperature is raised from the presintering temperature to the sintering temperature at approximately 2°–4° C./minute.

12. A process according to claim 10 in which the palladium oxide particles and silver particles, prior to being put into the organic vehicle, are mixed together and heated to approximately 450° C. for at least approximately 15 minutes to ensure that any unoxidized palladium is oxidized.

13. A process according to claim 10 in which the ratio, by weight, is approximately 40–46% palladium oxide to 60–54% silver.

* * * * *